United States Patent [19]

Molnar

[11] Patent Number: 5,068,545
[45] Date of Patent: Nov. 26, 1991

[54] DIGITAL/FREQUENCY INPUT FOR INDUSTRIAL CONTROL APPLICATIONS

[75] Inventor: Richard J. Molnar, Willoughby, Ohio

[73] Assignee: Elsag International B.V., Amsterdam, Netherlands

[21] Appl. No.: 340,984

[22] Filed: Apr. 20, 1989

[51] Int. Cl.⁵ .................. H03K 3/42; H03K 5/00; H03K 5/08; H01S 3/00
[52] U.S. Cl. .................. 307/311; 307/270; 307/261; 328/28; 372/38
[58] Field of Search ............... 307/311, 490, 475, 261, 307/270; 328/27, 35, 28; 372/38

[56] References Cited

U.S. PATENT DOCUMENTS

| | | | |
|---|---|---|---|
| 4,321,487 | 3/1982 | Huykman | 307/311 |
| 4,484,331 | 11/1984 | Miller | 307/311 |
| 4,645,948 | 2/1987 | Morris et al. | 307/310 |

Primary Examiner—Stanley D. Miller
Assistant Examiner—Trong Phan
Attorney, Agent, or Firm—Vytas R. Matas; Robert J. Edwards; Eric Marich

[57] ABSTRACT

An input circuit for conditioning a control signal having a variety of waveforms and voltage levels, comprises a pair of input terminals having a metal oxide varistor connected thereacross. One terminal is connected to the base of a transistor thru a resistor, the emitter of the transistor driving an opto-coupler for isolating the control signal from a micro-processor which receives the control signal over an inverter having a Schmitt trigger input.

7 Claims, 2 Drawing Sheets

DIGITAL/FREQUENCY INPUT FOR INDUSTRIAL CONTROL APPLICATIONS

FIELD AND BACKGROUND OF THE INVENTION

The present invention relates in general to signal processing for industrial control applications, and in particular to a new and useful input circuit for receiving a wide variety of signals.

Industrial digital and frequency inputs normally are a resistive circuit with opto-coupling for the required isolation. They are able to take a standard control signal such as 24 VDC, 125 VDC, 117 VAC, or 230 VAC.

A drawback to these circuits is that they require jumper settings to select a desired signal range. Otherwise, the circuits are limited to only one signal type. A common problem is that customers end up with the jumpers in the wrong positions for their application, thus failure occurs.

Another problem with a resistive input is that as the applied voltage is increased, the power consumption increases at an accelerated rate. Also, there is a limit to signal knowledge depending on the method of monitoring. For example, if the level is checked ten times a second, it may be adequate for a digital input; however, a 5 Hz frequency is the highest it would be able to pick up according to Shannon's sampling theorem. On the other hand, if it is monitored at smaller increments like 20,000 times a second, then there probably would not be much time to do anything else. At this point a frequency-to-voltage converter may seem appealing; however, this requires an analog signal measurement which is indirect and more difficult to implement.

SUMMARY OF THE INVENTION

The present invention comprises an input circuit for industrial control applications which includes a metal oxide varistor connected between input terminals of the circuit, a diode connected to one of the input terminals for preventing a negative current flow, a zener diode connected across the input terminals for limiting voltage supplied to a transistor which has a base connected to one of the input terminals and which is connected to an opto-coupler. The opto-coupler has an output connected to the Schmitt trigger input of an inverter. The output of the inverter is connected to a micro-processor or other apparatus for receiving an industrial control signal.

The circuit of the invention is capable of receiving a wide range of DC and AC voltage, thus eliminating the need for jumpers.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
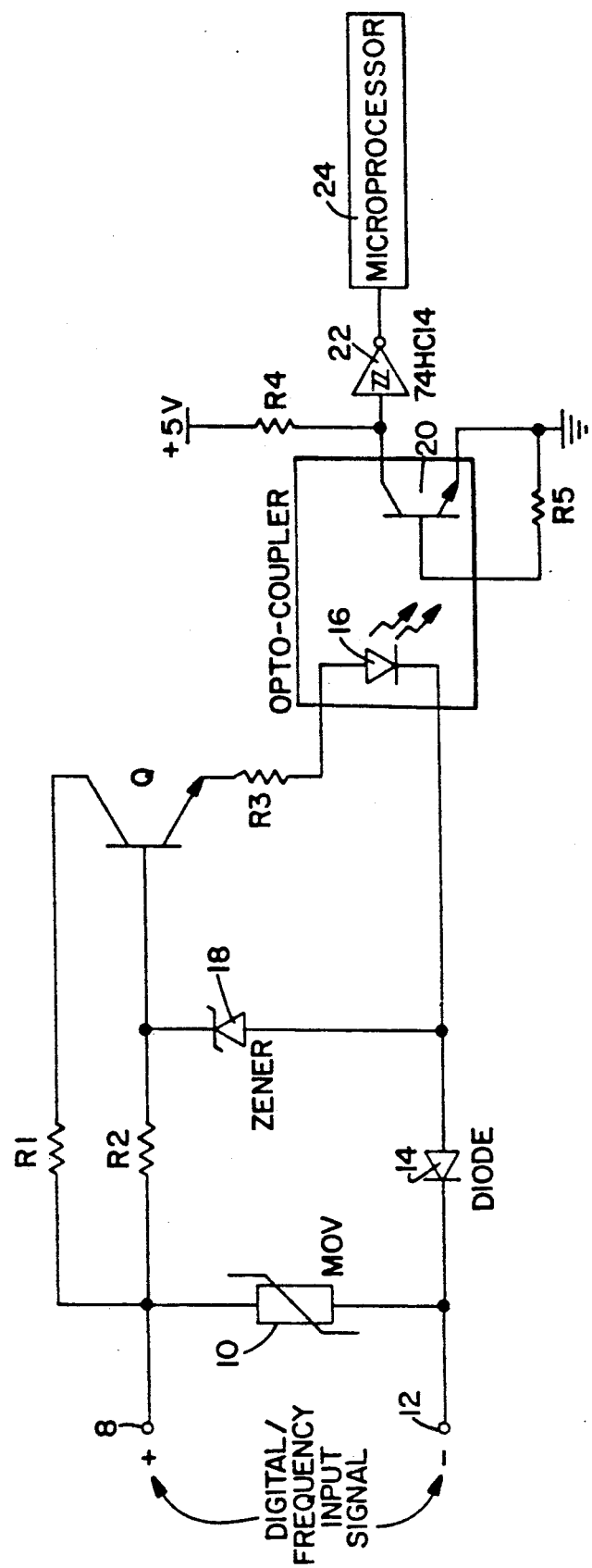
FIG. 1 is a schematic diagram of the input circuit according to the present invention.
Figure 2:
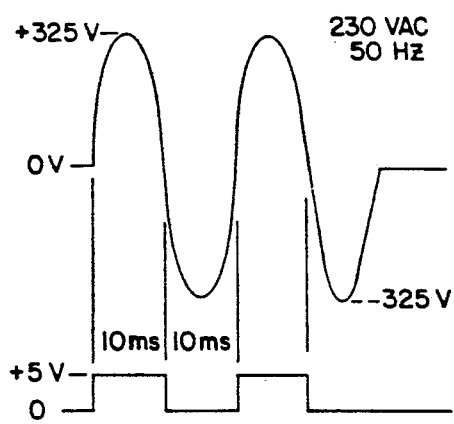
FIG. 2 is a waveform diagram showing the waveform of a possible input control signal at the top, and the waveform of a respective signal at the bottom, which has been conditioned by the input circuit for use by a micro-processor or other industrial control apparatus.
Figure 3:
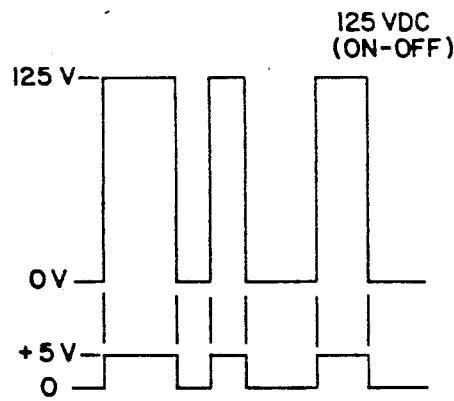
FIG. 3 is a view similar to FIG. 2 showing another input control signal.
Figure 4:
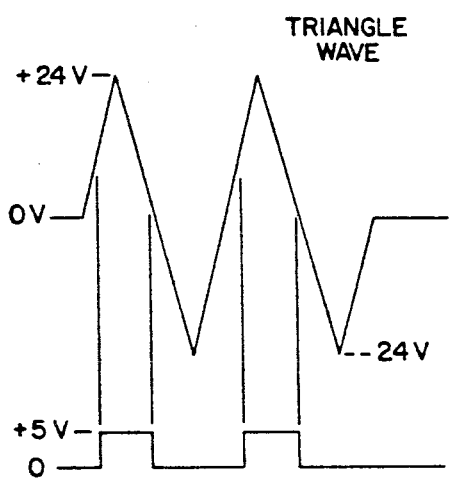
FIG. 4 is a view similar to FIG. 2 showing a still further input control signal.
Figure 5:
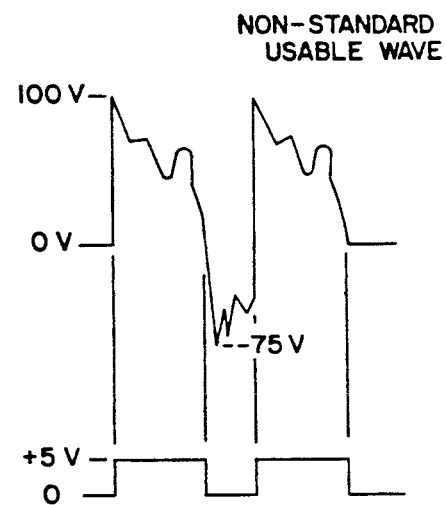
FIG. 5 is a view similar to FIG. 2 showing a possible non-standard input control signal.

Referring to the drawings in particular, the invention embodied therein comprises a control circuit for receiving and conditioning input control signals having a wide variety of waveform and voltage, and for supplying the signals to a micro-processor or other industrial control apparatus.

The invention provides an improved digital/frequency input which is designed for industrial control applications. A circuit diagram of the invention is shown in FIG. 1.

The circuit allows a wide range of standard and non-standard control signals to be applied. When tested, it had a minimum high level threshold voltage of 11 volts and a low level maximum of 8 volts for a zero to 10 KHz signal. The circuit is capable of withstanding an input voltage of 130 VDC and 250 VAC. Therefore, it can handle any DC control signals from about 15 volts to 130 volts and AC control signals from about 15 volts to 250 volts. Some of the standard control input signals this will take are 15 VDC, 24 VDC, 28 VDC, 125 VDC, 24 VAC, 117 VAC, and 230 VAC. All of these signals can be applied without the need of jumpers to select the range. The only criteria for the input signal is that it is above 15 volts for high level and below 2 volts for low level while at the same time not exceeding +130 VDC, 250 VAC or going negative more than −350 VDC. The signal frequency limit was tested up to about 45 KHz; however, 10 KHz is good enough for most of the control signal applications. Therefore, practically any waveform shape that holds to this criteria may be used successfully.

Some varying examples of possible input signal waveforms are shown at the top of FIGS. 2 to 5 with the conditioned signal shown at the bottom of each input signal waveform seen in the same Figures. Some waveform types that can be used are sinusoidal square, triangle, and non-standard as seen in FIGS. 2 to 5 respectively.

Returning now to FIG. 1, the circuit includes a MOV (metal oxide varistor) 10 on the input terminals 8 and 12, which suppresses transients that appear over 370 volts. A diode 14 allows positively biased signals to pass and cuts off negatively biased signals. In the reverse bias mode hardly any current flows which saves power and the rest of the components. As the signal is applied positively to activate the high level, transistor Q turns on which allows current thru an opto-coupler diode 16. The transistor Q and a zener diode 18 have bias currents supplied from the signal thru resistor R2. Once the zener voltage is reached, it controls a steady current thru Q. This is due to the nearly constant voltage appearing across an output resistor R3. Therefore, after the signal reaches this point it will only draw 3 to 4 mA regardless of how much higher the signal goes.

This current thru the opto-coupler diode 16 will cause the opto-coupler transistor 20 to conduct thereby pulling the input to a 74HC14 inverter with Schmitt trigger 22, low. The 74HC14 has a Schmitt trigger input which provides the hysteresis necessary to keep noise from causing false pulses. The inverted output of the 74HC14 is taken to an input pin of a microprocessor 24 which uses the signal for some industrial control function.

As the applied control signal drops, it will reach a point where the current thru R3 and the opto-coupler 16, 20 is such that it allows the pull-up resistor R4 to raise the input voltage to the 74HC14 which causes the inverter output to go low. The micro-processor can sense these changes in levels (edge triggered interrupts). These interrupts can mark time by keeping track of the counts between them. Since there is a known internal clock frequency, one can determine the interrupt frequency. In a DC digital control input situation, one can determine if the level is high or low from reading the port or by keeping track of the transition state.

AC line digital control input signals can be realized by using the frequency mode. An AC line signal can be recognized as a 45 to 65 Hz frequency for the high level signal and less than this for a low level signal. For 50/50 duty cycle waveforms, the frequency can be determined in half of a cycle. Another approach for determining the frequency is to count the transitions in a fixed period of time; however, this will not give quick results.

In FIG. 1, resistor R1 is connected between the positive input terminal 8 and the collector of transistor Q, for protecting the collector against surged current. Resistor R5 is connected between the base and emitter of the opto-coupler transistor 20 for reducing noise, and for evening out opto-coupler on-off switching times.

The opto-coupler 16, 20 can, for example, be a 4N36, which is generally available in the industry.

Micro-processor 24 requires a 0-5 V digital signal to sense the input control signal and provide adequate control to devices connected to the micro-processor.

The MOV 10 prevents transients and noise spikes while the zener 18 sets the voltage for transistor Q, which requires a control voltage to operate and itself set up a constant current to the opto-coupler.

The improved digital/frequency input of the invention has many advantages over prior methods.

The elimination of physical jumpers in the circuit eliminates the need for a customer to set the jumpers. Not only does this free the customer from going thru documentation on jumper positions, but it helps prevent failure due to incorrect jumper settings.

Since the inventive circuit is practically waveform independent, this gives the customer the flexibility of running sinusoidal signals, square wave (on-off DC signals), or non-standard signals such as a triangular, if so desired.

Since this circuit doubles as a digital and/or frequency input, additional circuitry such as frequency-to-voltage converters or AC coupled configurations are not required.

The circuit limits the current input to 3 to 4 mA which greatly reduces power consumption when high voltages are applied. For instance, if the voltage applied increased from 24VDC to 125VDC, then the power in a standard resistive input circuit would go up by over 27 times what it started at; whereas, the improved circuit only goes up by a factor of about 5.

This circuit typically pulls 3 to 4 mA. It requires a minimum current to activate the high level state; thus, this will provide some inherent noise immunity. The 74HC14 with its Schmitt trigger input builds in hysteresis which helps prevent output oscillation during level transitions. The resistor R5 helps reduce noise from activating the opto-coupler.

This invention can be applied to a variety of input ranges and sensitivity level by changing the values of R1, R2, R3 and the zener voltage. This would redefine the threshold voltages and input current limiting values.

While a specific embodiment of the invention has been shown and described in detail to illustrate the application of the principles of the invention, it will be understood that the invention may be embodied otherwise without departing from such principles.

What is claimed is:

1. A circuit for conditioning a control signal having a variety of waveforms and voltage levels, comprising:
   a pair of input terminals for receiving the control signal;
   a varistor connected across said terminals for limiting a high transient voltage across said terminals;
   a diode connected to one of said terminals for preventing a flow of reverse current to said one terminal;
   a transistor having a base connected thru a first resistor to the other one of said terminals, said transistor having an emitter and a collector; and
   opto-coupler means connected to the transistor emitter thru a second resistor for receiving current therefrom, said opto-coupler means having an isolated output for outputting the conditioned control signal, and a third resistor connected at one end thereof to the input terminal connected to said first resistor and at the other end thereof to said collector.

2. A circuit according to claim 1 including said first resistor having one end connected to one end of said varistor, and a zener diode connected to an opposite end of said first resistor, said diode being connected between said varistor and said zener diode.

3. A circuit according to claim 1 including an inverter having a Schmitt trigger input connected to the output of said opto-coupler means, said inverter having an inverting output.

4. A circuit according to claim 3 including a microprocessor connected to said inverting output of said inverter.

5. A circuit according to claim 3 wherein said diode is connected between one end of said varistor and a zener diode, and said first resistor is connected between opposite ends of said varistor and said zener diode, and the base of said transistor is connected to said first resistor.

6. A circuit according to claim 5, wherein said opto-coupler means comprises an opto-diode connected between said second resistor and said diode, and an opto-transistor optically connected to said opto-diode.

7. A circuit according to claim 6 including an inverter having a Schmitt trigger input connected to the collector of said opto-transistor, said inverter having an inverting output and a fourth resistor connected between an input of said inverter and a voltage supply of selected level.

* * * * *